June 21, 1938.   H. E. VAN VOORHEES   2,121,577
WINDOW ASSEMBLY FOR AUTOMOTIVE VEHICLES
Filed Oct. 12, 1932   3 Sheets-Sheet 1
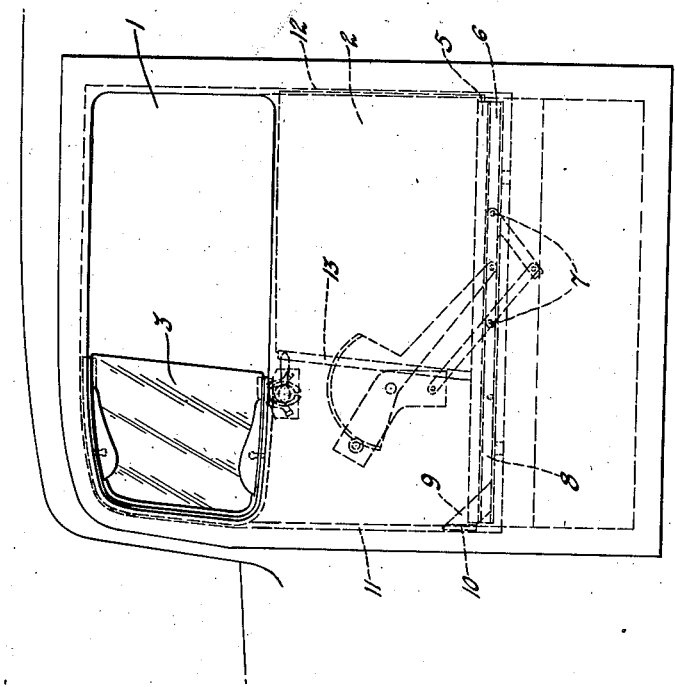
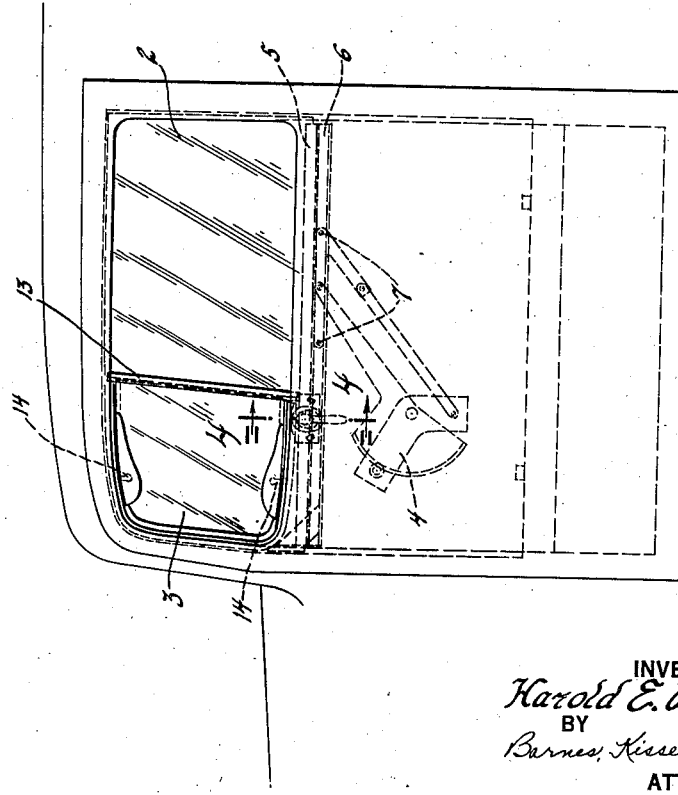
INVENTOR
Harold E. Van Voorhees
BY
Barnes, Kisselle & Laughlin
ATTORNEYS

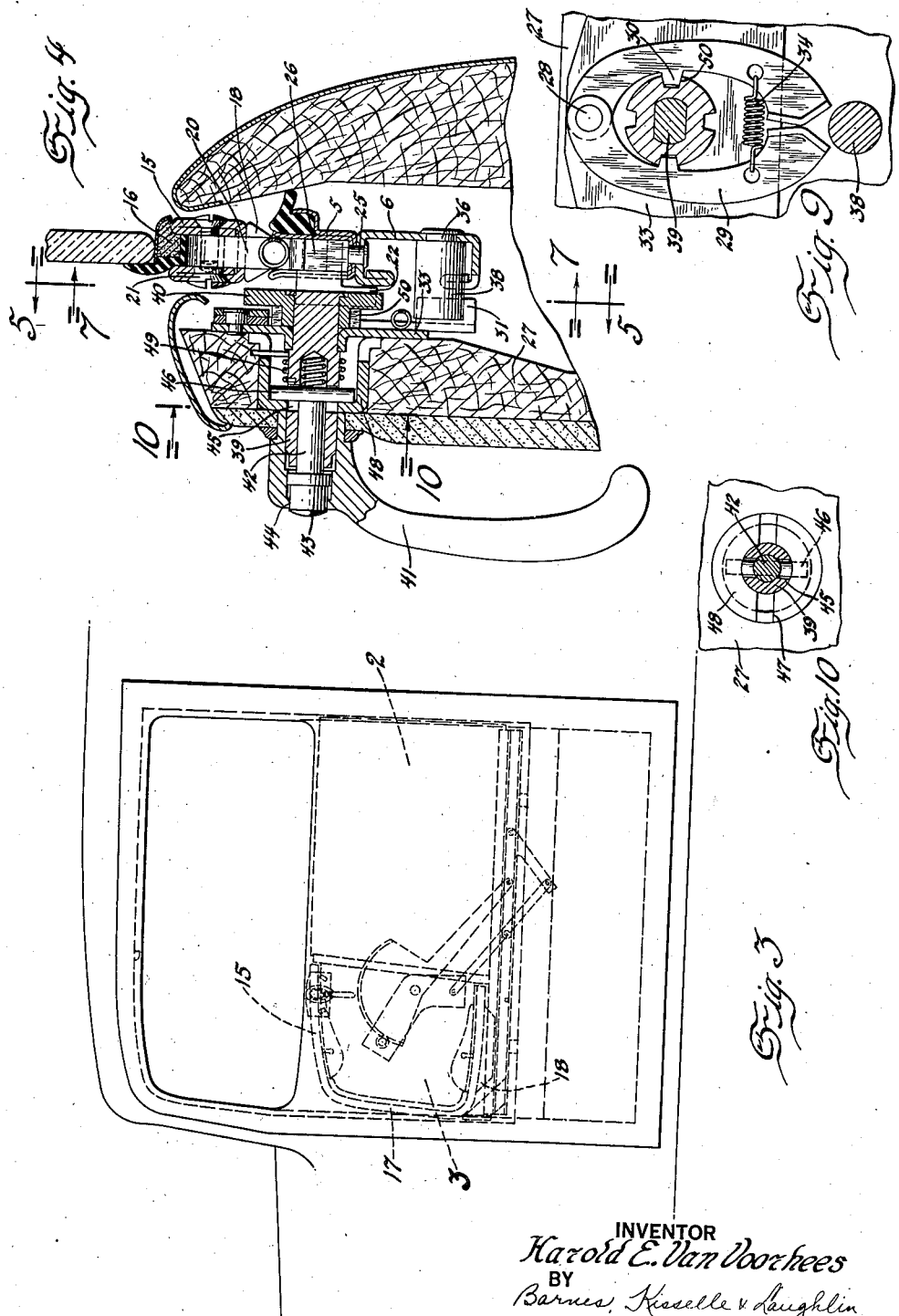
June 21, 1938.  H. E. VAN VOORHEES  2,121,577
WINDOW ASSEMBLY FOR AUTOMOTIVE VEHICLES
Filed Oct. 12, 1932   3 Sheets-Sheet 2
INVENTOR
Harold E. Van Voorhees
BY
Barnes, Kisselle & Laughlin
ATTORNEYS June 21, 1938.   H. E. VAN VOORHEES   2,121,577
WINDOW ASSEMBLY FOR AUTOMOTIVE VEHICLES
Filed Oct. 12, 1932   3 Sheets-Sheet 3
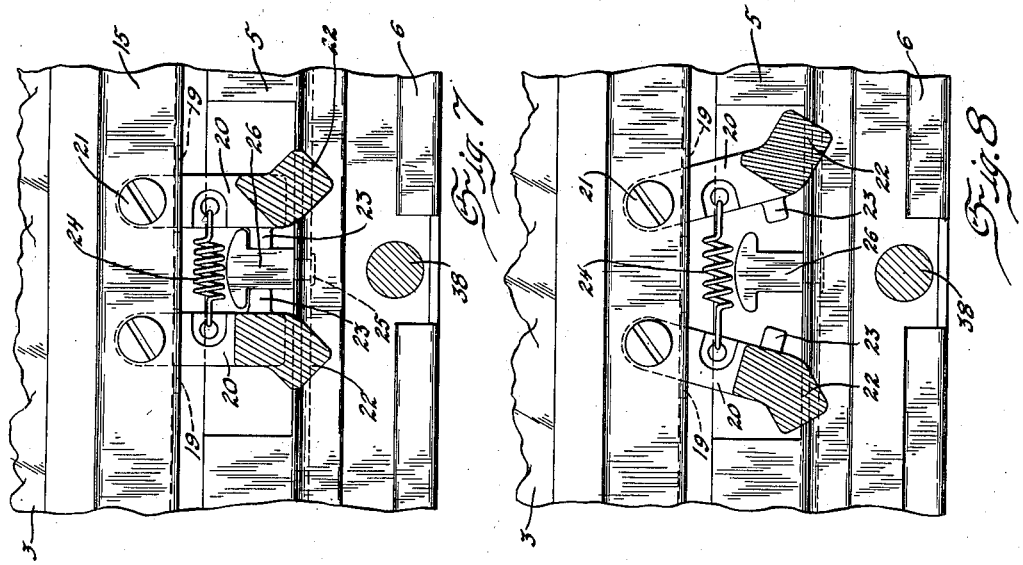
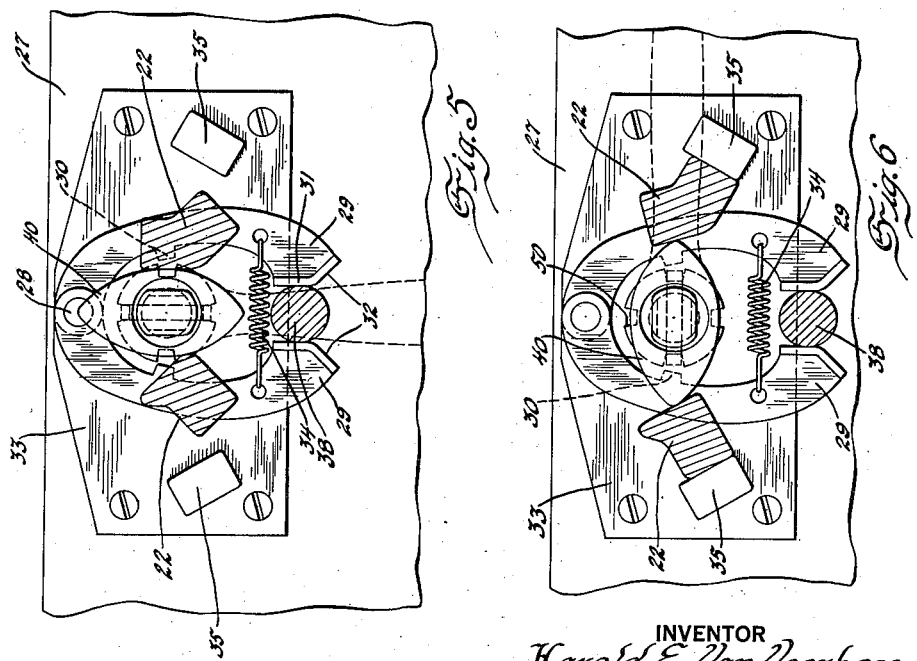
INVENTOR
Harold E. Van Voorhees
BY
Barnes, Kisselle & Laughlin
ATTORNEYS Patented June 21, 1938

2,121,577

UNITED STATES PATENT OFFICE 2,121,577

WINDOW ASSEMBLY FOR AUTOMOTIVE VEHICLES

Harold E. Van Voorhees, Windsor, Ontario, Canada, assignor to Ternstedt Manufacturing Company, Detroit, Mich., a corporation of Michigan Application October 12, 1932, Serial No. 637,484

24 Claims. (Cl. 296—44)

This invention relates to a window assembly for an automotive vehicle and more particularly relates to that type of window assembly which has a glass panel that can be raised and lowered to close and open the window opening and another glass panel which is pivotally mounted to swing about its axis to serve as a wind wing. In this type of window assembly it may be desirable to also lower the swingable panel when not being used as a wind wing. Hence, it is an object of this invention to produce a window assembly comprising a pair of panels one of which is arranged to move in and out of the window well to open and close the window opening and the other of which is swingably mounted in the window opening to serve as a wind wing and is optionally movable in and out of the window opening as a unit with the first mentioned panel.

This invention further contemplates a composite window for closing a window opening comprised of two panels one of which can be raised from and lowered into the window well and the other of which is swingably mounted to serve as a wind wing and can also be raised from and lowered into the window well. A further object of the invention is to produce such a composite window in which the two panels can be raised from and lowered into the window well optionally either as a unit or the one independent of the other.

It is an object of this invention to produce a window assembly as above set forth in which the swinging panel is positively locked against movement into the window well when the other panel has retreated partially or entirely into the well and wherein the raising of the one panel into closed position is a necessary precedent to the lowering of the swinging panel.

In the drawings:

Fig. 1 is a side elevation of a portion of an automotive vehicle showing the window opening in which the swingable panel and the slidable panel are in closed position.

Fig. 2 is a view similar to Figure 1 in which the slidable panel has been lowered into the window opening.

Fig. 3 is a view similar to Figure 1 in which both the slidable and swingable panels have been lowered as a unit into the window well.

Fig. 4 is a section along the line 4—4 of Figure 1.

Fig. 5 is a section along the line 5—5 of Figure 4 showing in detail the relation of the locking parts when the slidable and swingable panels are interconnected for raising and lowering as a unit.

Fig. 6 is a view similar to Figure 5 showing the position of the parts when the slidable panel is arranged to be raised and lowered independently of the swingable panel.

Fig. 7 is a section along the line 7—7 of Figure 4 showing in detail the interlocking parts when the swinging and slidable panels are arranged to slide up and down as a unit.

Fig. 8 is a view similar to Figure 7 showing in detail some of the parts when the sliding panel is arranged to slide independently of the swinging panel.

Fig. 9 is a detail showing the position of the locking dogs with the spreader pin removed.

Fig. 10 is a section along the line 10—10 of Figure 4.

Referring to the drawings, there is shown a window opening 1 of an automotive vehicle which is closed by a composite window comprising panels 2 and 3. The term "composite window" as herein used refers to that type of window which is composed of at least two sections or panels, the cooperation of both the panels being necessary to close the window opening. As here shown the window opening 1 is in the front door of an automotive vehicle but it is understood that this window assembly can be used on both of the doors of the vehicle as well as in conjunction with any of the other window openings. The panel 2 is arranged to be raised from and lowered into the conventional window well to close and open the window opening by any suitable window regulator 4. As here shown the window regulator is the stamped segment gear type with a two point lift pin connection as at 7 with the sash bracket 6 which is riveted to the bottom of the lower window sash channel 5. The lift pins 7 travel back and forth in the channel 6 in the conventional way as the slide panel 2 is raised and lowered. It will be noted that the sash bracket 6 extends beyond the sloping edge of the panel 2 as at 8. The extension 8 of the bracket 6 has fixed thereto the plate 9 which in turn has fixed thereto the slide 10 which slides upwardly and downwardly in the channel guideway 11 (Figure 2). The perpendicular edge of the panel 2 is guided in the channel runway 12 in the conventional manner, which in conjunction with the slide 10 operating in the channel 11 serves to properly guide the panel 2 as it is raised and lowered.

The panel 2 has fixed to its inclined edge the H-channel 13 as shown in detail and claimed in the co-opending application of Emory Glenn Simpson, Serial No. 618,188 issued as Patent No. 2,087,821 on July 20, 1937 which overlaps the correspondingly inclined edge of the swinging panel 3 to interlock the two panels when in raised position.

The swinging panel 3 is provided with a pair of vertically aligned pivots 14 which are secured to the supporting channel 15 which surrounds the top and bottom and forward edges of the swingable panel. The channel 15 also carries a suitable weatherstrip 16 for sealing the pivoted panel against the weather. The lower part of the front upright portion 17 of the channel 15 slidably engages the runway 11 when the panel 3 is raised and lowered with the panel 2. The lower portion beneath the bottom edge of the swinging panel 3 is provided with a rudder-like projection 18 which sits upon and slightly within the window sash channel 5 (Figures 3 and 4).

As shown in Figures 1 and 3, the panels 2 and 3 are operatively connected to act as a unit. Hence, the details of the connection between these two panels will now be described. Referring to Figure 7, the channel 15, in which the panel 3 is pivotally supported, is provided with a pair of openings 19 through which project the legs 20. The legs 20 are pivotally mounted between the upstanding sides of the channel 15 upon the pins 21. The legs 20 are each provided with an offset seat portion 22 and the projecting lugs 23. The legs 20 are interconnected by the coil spring 24 which tends to pull them together. The window sash channel 5 and bracket 6 have riveted thereto as at 25 the hook member 26 which interengages the lugs 23 of the legs 20 to lock the channel 15 to the sash channel 5 and associated bracket 6 which in turn requires the swinging panel 3 and sliding panel 2 to operate as a unit when the window regulator 4 is operated.

Since it is desirable at times to lower the sliding panel 2 independently of the swinging panel 3, to this end the lock board 27 has mounted on its outer face the plate 33 which pivotally supports at 28 the dogs 29 each of which has a projecting lug 30. The lower ends of the dogs 29 are turned outwardly as at 31 to provide the cam surfaces 32. The dogs 29 are interconnected by the coil spring 34 which tends to draw them together. The plate 33 also carries the seats 35, the purpose of which is explained below. The bracket 6 has riveted thereto as at 36 the spreader pin 38 which engages the cam surfaces 32 of the dogs 29 to spread them.

When it is desired to lower the sliding panel 2 without the pivoted panel 3 of necessity the lugs 23 of the legs 20 must be disengaged from the hook 26. Hence, to this end the plate 33 has journaled therein the spindle 39. The inner end of the spindle 39 has fixed thereto the cam 40 for spreading legs 20 and the outer end the operating handle 41. The spindle 39 is bored axially to slidably receive the push rod 42, one end of which carries the button 43 which projects through the opening 44 in the handle 41. The spindle is provided with the diametrical slot 45 which slidably but nonrotatably receives the spring loaded pawl 46. The spring loaded pawl 46, when the handle 41 is rotated 90°, as shown in Figure 6, snaps into locking notches 47 in the bushing 48 which is fixed in a suitable opening provided therefor in the lock board 27. The handle 41 is turned from the vertical position shown in Figure 4 against the tension of the coil spring 49 which is carried by the spindle and tends to maintain the handle 41 in its vertical position. The seats 35 in conjunction with seat portions 22 and cam 40 limit the rotation of the handle 41 to 90°.

The cam member 40 has a hub portion provided with four notches 50 spaced 90° apart. These locking notches receive the lugs 30 of the dogs 29 to hold the handle 41 against rotation except when the sliding panel is raised and the spreader pin 38 has spread the dogs 29 (Figures 5 and 6).

The operation of the device is as follows: When it is desired to raise and lower the sliding panel 2 and the swinging panel 3 together as a unit the handle 41 will be in the vertical position shown in Figures 1 and 4, at which time the long diameter of the cam 40 is likewise vertical thus permitting the spring 24 to pull the legs 20 into locking engagement with the hook 26 (Figures 5 and 7), thus locking the channel 15 and associated swinging panel to the sash channel 5 of the sliding panel 2. Hence, operating of the window regulator 4 will lower and raise the panels 2 and 3 together as a unit.

If it is desired to use the panel 3 as a wind wing either to withdraw air from the vehicle body or to scoop air into the vehicle body, the handle 41 is swung 90° to the horizontal position shown in Figures 2 and 6, at which time the pawl 46 snaps into the locking notches 47 in the bushing 48 thus preventing the handle 41 from swinging back to the vertical position. The turning of the handle 41 to the horizontal position likewise turns the cam 40 from the position shown in Figure 5 to the position shown in Figure 6 with the long diameter horizontal thus causing the cam to cam the legs 20 outwardly into seating engagement with the seats 35 and at the same time disengaging the locking lugs 23 from the hook 26. Now as the window regulator is operated the sliding panel 2 only will be lowered guided in the guideways 11 and 12. As the sliding panel 2 is lowered the H-channel 13 draws away from the inclined edge of the panel 3 and the panel 3 can now be swung about its pivots and used as a wind wing. At this time the sliding window can again be raised to closed position if desired and the entire ventilation regulated by the swinging panel 3.

Although the panels 2 and 3 are shown in the same plane and when in window closing position interlocked by the H-channel 13 it is specifically understood that the invention is not limited to the interlocking of the panels 2 and 3 by the H-channel 13. This arrangement is shown by way of example only and the entire mechanism for raising and lowering the panel 2 independently of the swinging panel 3 or together with panel 3 as a unit may be accomplished without this interlocking feature of the two panels.

When the handle 41 is in horizontal position and the sliding panel 2 lowered, the pin 38 is removed immediately from between the outwardly turned cam portions 31 of the locking dogs 29 thus permitting the spring 34 to pull the locking dogs together into interlocking engagement with the diametrically opposed locking notches 50 (Figure 9) in the hub portion of the cam 40, thereby dogging the handle 41 against rotation as long as the sliding panel 2 is partially or completely lowered. Hence, at this time even though the push button 43 is pressed inwardly to disengage the pawl 46 from the locking notches 47 in the bushing 48, the handle 41 can not be turned.

If it is now desired to again connect the panels 2 and 3 so that they will operate as a unit, the panel 3 must be raised to closed position so that the pin 38 will ride up the cam surfaces 32 of the locking dogs 29 thus spreading them apart and disengaging the lugs 30 from the notches 50 in the hub of the cam 40 to permit turning of the cam. At this time the push button 43 may be pressed inwardly causing the pawl 46 to disengage from the locking notches 47 thus permitting the spring 49 to return the handle 41 to vertical position and the cam 40 so that the long diameter is likewise vertical. This permits the spring 24 to withdraw the supporting legs 20 from the seats 35 into interlocking relation with the hook 26, thus coupling the swinging panel again to the sash of the sliding panel. The sliding panel and pivoted panel will now raise and lower as a unit.

The general arrangement of a swinging panel together with a sliding panel, cooperating to regulate ventilation, is not broadly claimed in this application as this is the invention of Alfred J. Fisher, and is claimed in application Serial No. 644,622, filed November 28, 1932, issued as Patent No. 2,048,605 on July 21, 1936.

I claim:

1. A window assembly for an automotive vehicle having a window-opening and a window well comprising in combination a window panel adapted for movement into and out of the window well, a swingable panel mounted in the window opening to serve as a wind wing and movable into and out of the well, and means for optionally connecting the swingable panel with the first mentioned panel while the panels are in the same plane whereby the two panels may be moved into the window well as a unit.

2. A window assembly for an automotive vehicle having a window-opening and a window well comprising in combination a slidable panel arranged to be raised from, and lowered into, the window well to close and open a portion of the window-opening and a swingable panel for closing the remaining portion of the window-opening, and means for optionally connecting the swingable panel to the slidable panel in the same position the one panel occupies relative to the other when in window-opening closing position whereby the two panels may be lowered into the window well as a unit and in the same relative position.

3. A window assembly for an automotive vehicle having a window-opening and a window well comprising in combination a composite window for closing the window opening consisting of a pair of panels one of which is swingable in the window-opening about an up and down axis between its front and rear edges to serve as a wind wing, and means for optionally locking the swingable panel to the other panel whereby the two panels may be moved into the window well as a unit.

4. A window assembly for an automotive vehicle having a window-opening and a window well comprising in combination a composite window for closing the window opening comprised of two panels which lie in the same plane when in window-opening closing position, one of said panels being swingable out of the plane of the other to serve as a wind wing, and means for optionally connecting the swingable panel with the other panel while in the same plane whereby the composite window may be moved into the window well as a unit with both panels in the same plane.

5. A window assembly for an automotive vehicle having a window opening and a window well comprising in combination a composite window for closing the window opening and adapted to retreat into the window well to open the window opening consisting of a plurality of panels one of which is swingable to serve as a wind wing, means for disconnecting the swingable panel from the other panel and supporting the swingable panel in raised position so that the other panel can retreat into the window well independently of the swingable panel, and means for locking the aforementioned means in swinging-panel supporting position when the other panel is in retreated position.

6. A window assembly for an automotive vehicle having a window opening and a window well comprising in combination a composite window for closing the window opening and adapted to retreat into the window well to open the window opening consisting of a plurality of panels one of which is swingable to serve as a wind wing, means for interengaging the swingable panel and the other panel so that they will retreat into the window well as a unit, means operatively associated with the aforesaid interengaging means when the composite window is in raised position operable to release the interengaging means and secure the swingable panel in raised position whereby the other panel may be lowered independently of the swingable panel.

7. A window assembly for an automotive vehicle having a window opening and a window well comprising in combination a composite window adapted to be raised from and lowered into the window well to close and open the window opening, the said composite window comprising a pair of panels one of which is swingable to serve as a wind wing when in raised position, cooperating supporting elements associated with the swingable panel and the vehicle body for supporting the swinging panel when in raised position, and means for locking the cooperating supporting members in window supporting position when the swingable panel is disengaged from the other panel.

8. A window assembly for an automotive vehicle having a window opening and a window well comprising in combination a composite window adapted to be lowered into and raised from the window well to open and close the window opening, the said composite window comprising a plurality of panels one of which is swingable, interengaging members associated with the swingable and the other panel for interengaging the panels, cooperating supporting members mounted upon the swingable panel and the vehicle body and means for disengaging the interengaging members of the swingable and other panel and for engaging the supporting members associated with the swingable panel and the body for supporting the swingable panel in raised position to serve as a wind wing whereby the other panel may be lowered independently of the swingable panel.

9. A window assembly for an automotive vehicle having a window opening and a window well comprising in combination a composite window adapted to be lowered into and raised from the window well to open and close the window opening, the said composite window comprising a plurality of panels one of which is swingable, interengaging members associated with the swingable and the other panel for interengaging the panels, cooperating supporting members mounted upon the swingable panel and the vehicle body and means for disengaging the interengaging members of the swingable panel and other panel and for engaging the supporting members associated with the swingable panel and the body for supporting the swingable panel in raised position to serve as a wind wing whereby the other panel may be lowered independently of the swingable panel, and dogging means for dogging the cooperating supporting elements in window panel supporting relation.

10. A window assembly for an automotive vehicle having a window opening and a window well comprising in combination a composite window adapted to be lowered into and raised from the window well to open and close the window opening, the said composite window comprising a plurality of panels one of which is swingable, interengaging members associated with the swingable and the other panel for interengaging the said panels, cooperating supporting members associated with the swingable panel and the vehicle body, means for disengaging the interengaging members of the swingable and other panel and for engaging the supporting members associated with the swingable panel and the body for supporting the swingable panel in raised position to serve as a wind wing whereby the other panel may be lowered independently of the swingable panel, dogging means for dogging the swingable panel support members in panel supporting relation when the other panel is lowered, and dog release means carried by the other panel for releasing the said dogging means when the other panel is in raised position.

11. A window assembly for an automotive vehicle having a window opening and a window well comprising in combination a composite window adapted to be lowered into and raised from the window well to open and close the window opening, the said composite window comprising a plurality of panels one of which is swingable, means for interengaging the swingable panel and the other panel, a pivoted support member associated with the swingable panel, a fixed support member mounted in the window well and a cam member for disengaging the panel interengaging means and for pivoting the pivoted support member into engagement with the fixed support member whereby the pivoted panel is held in raised position and the other panel may be raised and lowered independently of the swingable panel.

12. A window assembly for an automotive vehicle having a window opening and a window well comprising in combination a composite window adapted to be lowered into and raised from the window well to open and close the window opening, the said composite window comprising a plurality of panels one of which is swingable, means for interengaging the swingable and the other panel, a pivoted support member associated with the swingable panel, a fixed support member mounted in the window well, a cam for disengaging the panel interengaging means and for pivoting the pivoted support member into engagement with the fixed support member whereby the pivoted panel is held in raised position and the other panel may be raised and lowered independently of the swingable panel, and locking means for holding the pivoted support element in supporting engagement with the fixed support element when the panel interengaging means are in released position.

13. A window assembly for an automotive vehicle having a window opening and a window well comprising in combination a composite window adapted to be raised from and lowered into the window well to close and open the window opening, the said composite window comprising a plurality of panels one of which is swingable, a support fixed in the window well, an interengaging member associated with one of the panels, and a shiftable member associated with the swingable panel, the said shiftable member in one position interengaging the member associated with the other panel to interengage the said panels and in another position engaging the fixed support member for holding the swingable panel in raised position to serve as a wind wing, and means for shifting the shiftable member from panel interengaging position to swingable panel supporting position.

14. A window assembly for an automotive vehicle having a window opening and a window well comprising in combination a composite window adapted to be raised from and lowered into the window well to close and open the window opening, the said composite window comprising a plurality of panels one of which is swingable, a support fixed in the window well, an interengaging member associated with one of the panels, a shiftable member associated with the swingable panel, the said shiftable member in one position interengaging the member associated with the other panel to interengage the said panels and in another position engaging the fixed support member for holding the swingable panel in raised position to serve as a wind wing, a cam for shifting the shiftable member from panel interengaging position to swingable panel supporting position whereby the other panel may be lowered independently of the swingable panel, and a dog for locking the shiftable member in the swingable panel supporting position.

15. A window assembly for an automotive vehicle having a window opening and a window well comprising in combination a composite window adapted to be raised from and lowered into the window well to close and open the window opening, the said composite window comprising a plurality of panels one of which is swingable, a support fixed in the window well, an interengaging member associated with one of the panels, a shiftable member associated with the swingable panel, the said shiftable member in one position interengaging the member associated with the other panel to interengage the said panels and in another position engaging the fixed support member for holding the swingable panel in raised position to serve as a wind wing, a cam for shifting the shiftable member from panel interengaging position to swingable panel supporting position whereby the other panel may be lowered independently of the swingable panel, a dog for locking the shiftable member in the swingable panel supporting position, and means carried by the other panel for releasing the dog when the panel is in raised position.

16. A window assembly for an automotive vehicle having a window opening and a window well comprising in combination a composite window adapted to be raised from and lowered into the well to close and open the window opening, the said composite window comprising a plurality of panels one of which is swingable, an interlocking member associated with one of the panels, a fixed support in the window well, an interlocking and support member associated with the swingable panel adapted to interlock with the interlocking member of the other panel when in one position whereby the panels may be raised and lowered as a unit and to engage the fixed support in another position to hold the swingable panel in raised position to permit the other panel to be raised and lowered independently of the swingable panel, a cam for pivoting the said member to one of said positions, a dog for locking the cam when the pivoted member is in panel supporting position, and a pin carried by the other window panel for releasing the dog from dogging engagement with the cam when the panel is in raised position.

17. A window assembly for an automotive vehicle having a window opening and a window well comprising in combination a pair of upright window guides in the said well, a composite window mounted between the said guides and slidable upwardly and downwardly in the said guides to open and close the window opening, the said composite window comprising a plurality of panels one of which is swingable to serve as a wind wing and the other of which may be lowered independently of the swingable panel, one of the upright edges of the latter panel slidably engaging in one of the aforementioned window guides, and a member carried by the lower edge of the panel projecting beyond the other upright edge of the panel and slidably engaging the other window guide whereby the said panel can be raised and lowered in the said guide independently of the swingable panel.

18. A window assembly for an automotive vehicle having a window opening and a window well comprising in combination a pair of window guides in the window well, a composite window mounted between and slidably engaging the said window guides and adapted to be raised and lowered to close and open the window opening, the said composite window comprising a pair of panels one of said panels being swingable and adapted to be held in raised position so that the other panel may be lowered and raised independently of the swingable panel, the other panel having one of its upright edges in slidable engagement with one of the aforementioned window guides, a window sash secured to the bottom edge of the said panel and extending beyond the other upright edge of the panel, a slide member secured to the extended portion of the sash and in slidable engagement with the other window guide whereby the composite window may be raised and lowered as a unit in the said window guides and the one panel may be raised and lowered in the said guides independently of the swingable panel.

19. A window assembly for a vehicle having a window opening and a window well, comprising a swingable panel mounted to swing on an up and down axis for closing a portion of the window opening and movable into and out of the window well, a second panel of less width than the window opening movable into and out of the window well for closing the remaining portion of the window opening, and means for optionally connecting the said panels whereby the said panels may while in the relation they occupy in closing position, be moved into the well as a unit or the sliding panel independently of the swinging panel.

20. A window assembly for a vehicle having a window opening and a window well, comprising a swingable panel mounted to swing on an up and down axis and movable into and out of the window well, a second panel of less width than the window opening movable into and out of the window well, one of said panels closing the front portion of the window opening and the other of said panels being positioned to the rear of the other panel for closing the rear portion of the window opening, and means for optionally locking the said panels together while in the same relative positions they occupy when in window-opening closing position whereby the said panels may be moved into the window well as a unit in this same relative position or the sliding panel independently of the swinging panel.

21. In a vehicle window assembly, the combination with a body having a window opening and a window well therebelow, of a composite window or sash having a glass panel of substantially less width than the opening and that can be swung on an axis intermediate its front and rear edges to exhaust air at the rear when the rear edge is swung outwardly at an angle somewhat less than 90° to the side of the body and to draw air in at the front of the forward edge of the swinging panel when that edge turns inwardly, the drawing of the air in at the front of the panel being due to the exhausting of the air at the rear of the panel, the said composite window having a second panel that substantially fills out the remainder of the window opening when the composite window is in its uppermost position, the said swinging panel, when the swinging section is turned into closed position, being substantially flush with the second panel of the composite window and the two panels arranged to form a plural panel sash unit or composite window which may be raised and lowered as a unit in the window opening and window well.

22. In a vehicle window assembly, the combination with a body having a window opening and a window well therebelow, of a composite window or sash having a glass panel of substantially less width than the said opening and that can be swung on an axis intermediate its front and rear edges to exhaust air at the rear when the rear edge is swung outwardly at an angle somewhat less than 90° to the side of the body and to draw air in at the front of the forward edge of the swinging panel when that edge turns inwardly, the drawing of the air in at the front of the panel being due to the exhausting of the air at the rear of the panel, the said composite window having a second panel that substantially fills out the remainder of the window opening when the composite window is in its uppermost position, the said swinging panel arranged to be swung 90° or more to scoop air into the body, when the swinging section is turned into closed position, being substantially flush with the second panel of the composite window and the two panels arranged to form a plural panel sash unit or composite window which may be raised and lowered as a unit in the window opening and window well.

23. In a vehicle window assembly, the combination with a body having a window opening and a window well therebelow, of a composite window or sash slidable up and down in said opening and well and having a glass panel of substantially less width than said opening and that can be swung on an axis intermediate its front and rear edges to exhaust air at the rear when the rear edge is swung outwardly at an angle somewhat less than 90° to the side of the body and to draw air in at the front of the forward edge of the swinging panel when that edge turns inwardly, the drawing of air in at the front of the panel being due to the exhausting of air at the rear of the panel, the said composite window having a second panel that substantially fills out the remainder of the window opening when the composite window is in its uppermost position, the said swinging panel, when the swinging section is turned into closed position, being substantially flush with the second panel of the composite window and the two panels arranged to form a plural panel sash unit or composite window which may be raised and lowered in the window opening and window well and a window regulator for aiding in the raising and lowering of the window and holding the same in varying positions of adjustment.

24. In a vehicle window assembly, the combination with a body having a window opening and a window well therebelow, of a pair of panels in substantially flush relation when closed and complementing each other to substantially fill out the window opening, both of which said panels are slidable in the window opening and well and one of which is swingable on a pivot intermediate its front and rear edges to exhaust air out of the vehicle at the rear of such swinging panel, when the panel is in open position and by such evacuating action thereby drawing air into the opening forward of the swinging panel afforded by the portion of the panel forward of the pivot swinging into the vehicle when the rear portion swings out.

HAROLD E. VAN VOORHEES.